United States Patent
Milunas

[11] Patent Number: 5,520,153
[45] Date of Patent: May 28, 1996

[54] INTERNAL COMBUSTION ENGINE CONTROL

[75] Inventor: Rimas S. Milunas, Rochester Hills, Mich.

[73] Assignee: Saturn Corporation, Troy, Mich.

[21] Appl. No.: 431,921

[22] Filed: Apr. 28, 1995

[51] Int. Cl.⁶ .................................................. F02M 51/00
[52] U.S. Cl. ............................................................ 123/480
[58] Field of Search ...................... 123/480, 481, 123/486, 492, 493, 435

[56] References Cited

U.S. PATENT DOCUMENTS

| | | | |
|---|---|---|---|
| 4,928,654 | 5/1990 | Hosaka | 123/486 |
| 4,957,088 | 9/1990 | Hosaka | 123/486 |
| 5,080,064 | 1/1992 | Buslepp et al. | 123/399 |
| 5,345,914 | 9/1994 | Tang | 123/478 |
| 5,423,208 | 6/1995 | Dudek et al. | 123/480 |
| 5,448,978 | 9/1995 | Hasegawa et al. | 123/480 |

OTHER PUBLICATIONS

Ser. No. 07/948,568 filed Sep. 23, 1992 Tang G–10001.
Ser. No. 08/217,824 filed Mar. 25, 1994 Dudek et al. G–11667.

Primary Examiner—Raymond A. Nelli
Attorney, Agent, or Firm—Michael J. Bridges

[57] ABSTRACT

Internal combustion engine cylinder volumetric efficiency is corrected for deviations in cylinder combustion temperature away from volumetric efficiency calibration combustion temperature to account for engine cylinder intake air and fuel dynamics under conditions deviating away from calibration conditions. The significance of the combustion temperature deviation on cylinder intake air and fuel heating is evaluated in accord with engine intake mass airflow information. The corrected volumetric efficiency is applied for improved cylinder intake air mass determination and for precise cylinder air/fuel ratio control.

4 Claims, 5 Drawing Sheets

INTERNAL COMBUSTION ENGINE CONTROL

FIELD OF THE INVENTION

This invention relates to internal combustion engine control and, more particularly, to control of engine air/fuel ratio.

BACKGROUND OF THE INVENTION

To maintain a desirable internal combustion engine air/fuel ratio, such as the stoichiometric ratio, the amount of fuel delivered to the engine is determined in response to an estimated or measured engine cylinder inlet air mass. Mass airflow sensors are available for measuring cylinder inlet air mass directly under steady state conditions characterized by substantially no intake manifold filling or depletion, but are not generally responsive enough to provide for accurate cylinder inlet air mass information under transient conditions characterized, for example, by significant time rate of change in engine intake manifold air pressure. Speed density approaches are sufficiently responsive to provide accurate cylinder inlet air mass information during even severe engine transient conditions, and therefore are known to be useful as a supplement to mass airflow sensor-based approaches during transient conditions. However, conventional speed density approaches suffer shortcomings in inlet air mass measurement accuracy under certain engine operating conditions. Inaccurate engine cylinder inlet air mass measurement can lead to deviations in engine air/fuel ratio away from a desired air/fuel ratio, such as the stoichiometric ratio, leading to increased engine emissions and reduced engine performance. It would be desirable to resolve the accuracy shortcomings in conventional speed density based engine air/fuel ratio control approaches.

The speed density approaches provide engine cylinder inlet air mass m as a function of engine intake manifold pressure MAP, for example using the ideal gas law, which may be expressed as $$m = MAP * V * VE / (R * T)$$

in which V is cylinder volume, VE is volumetric efficiency, R is the ideal gas constant, and T is air temperature. While the ideal gas law includes an air temperature term, the volumetric efficiency term applied with the ideal gas law to determine engine inlet air mass is conventionally determined using static calibration parameters. While such engine parameters as engine valve timing and engine cylinder port geometry, on which VE depends, do not change substantially during engine operation, other parameters on which VE depends, such as engine cylinder combustion temperature, can change significantly during engine operation, resulting in substantial open-loop engine air/fuel ratio error. VE is typically calibrated at a calibration combustion temperature. However, when the actual combustion temperature varies away from such calibration temperature, the heating of the fuel and air entering cylinder causes a gas expansion not comprehended by the VE calibration, resulting in a significant variation in the actual engine air/fuel ratio away from a desirable ratio. It would be desirable to compensate for such effects that drive actual volumetric efficiency away from calibration values, to improve engine air/fuel ratio control accuracy.

SUMMARY OF THE INVENTION

The present invention overcomes the shortcomings of conventional air/fuel ratio control by compensating directly for volumetric efficiency variations due to change in combustion temperature away from calibration temperatures.

More specifically, a steady state volumetric efficiency is calibrated under substantially constant combustion temperature conditions, and is modified by a combustion temperature dynamic volumetric efficiency gain. The gain is calculated as a function of the difference between the calibration combustion temperature and the current combustion temperature to account for the significant effect of such temperature difference on volumetric efficiency.

In yet a further aspect of this invention, the gain is modified as a function of an estimated or measured engine airflow rate. As airflow rate increases, the variation in combustion temperature away from a calibration temperature tends to perturb VE away from its calibration values by a smaller amount due to the higher mass of intake air and fuel resident in the cylinder for less time. The potential for VE to be perturbed by such a combustion temperature variation increases with decreasing airflow rate, as a smaller mass of intake air and fuel is exposed to the cylinder or combustion chamber for more time. Such effects are compensated in accord with this aspect of the present invention.

In yet a further aspect of this invention, a thermal model is provided for determining combustion temperature. More specifically, steady state combustion temperature is determined by applying sensed operating parameters to a steady state combustion temperature model. Heat transfer properties of the engine are applied to generate a thermal lag model of the relationship between steady state combustion temperature and combustion temperature under transient conditions. The thermal lag model, in yet a further aspect of this invention, includes a dynamic time constant indicating the combustion temperature thermal lag. The dynamic time constant varies with the engine operating level, such as indicated by engine airflow rate. The lag between combustion temperature under steady state and transient conditions, which varies in magnitude inversely with engine operating level, such as indicated by airflow rate, is thereby accounted for. The difficulties associated with direct measurement of combustion temperature are avoided through such further aspect of this invention.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
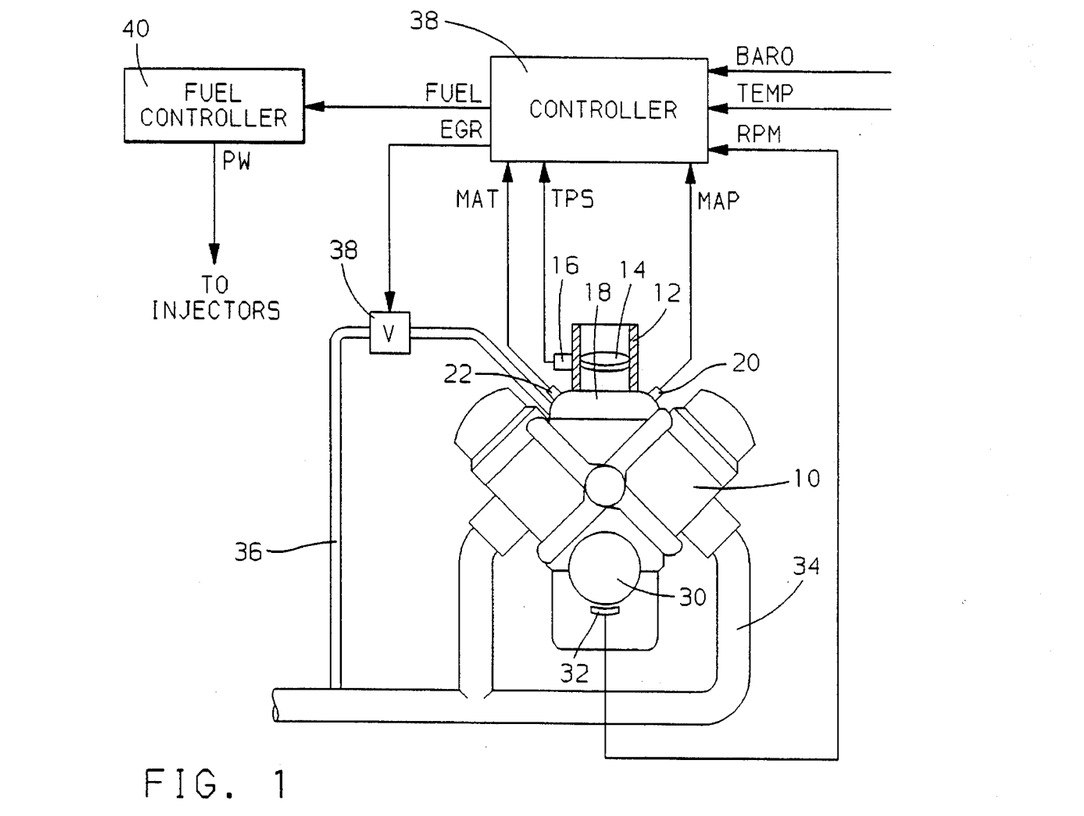
FIG. 1 is a general diagram of an internal combustion engine and engine control hardware in accord with the preferred embodiment.

Referring to FIG. 1, an internal combustion engine 10 receives inlet air through throttle bore 12 in which a conventional throttle valve 14 rotates to control the rate at which inlet air is received into intake manifold 18. The valve 14 may be a butterfly or rotary valve the rotational position of which corresponds to the degree that admission of inlet air is restricted through the bore. The rotational position of the valve 14 is transduced by sensor 16 which may be a conventional rotary potentiometer, having an output signal TPS indicating the rotational position.

The absolute pressure of air in the intake manifold 18 is transduced by conventional pressure transducer 20 and output as signal MAP. The temperature of inlet air in the manifold is transduced by conventional temperature sensor 22 and output as signal MAT. The engine 10 operates to rotate an output shaft 30, such as a conventional crankshaft, the rate of rotation of which is transduced by conventional sensor 32, which may be a Hall effect or variable reluctance sensor positioned in proximity to a plurality of spaced teeth or notches (not shown) provided about the circumference of the shaft 30 so that the field transduced by the sensor 32 is measurably disrupted by passage of the teeth or notches. The transducer outputs a periodic output signal RPM which is decoded using teeth or notch spacing information to indicate relative angular position and rate of rotation of the shaft 30, as is generally understood in the art.

Engine cylinder combustion gas products are exhausted from the engine cylinders (also referred to herein as combustion chambers) through exhaust gas conduit 34 for proper treatment thereof. A portion of exhaust gas is recirculated through pipe 36 to the engine intake manifold 18. The restrictiveness of the pipe 36 is varied through controlled positioning of EGR valve 38 so that a desirable dilution of the engine inlet air is provided to reduce certain engine exhaust gasses, such as oxides of nitrogen NOx.

Conventional engine controller 38, such as a commercial single-chip microcontroller including such elements as a central processing unit, read only memory unit, random access memory unit, and input-output unit is provided for receiving the sensor and transducer output signals and for generating, through execution of a series of operations stored in controller read only memory in the form of software instructions, a plurality of output signals providing for engine control and diagnostics functions. For example, controller output signal FUEL is output by the controller to a fuel controller 40 indicating a desired cylinder fuel injection quantity, to be described. The fuel controller 40 includes a single-chip microcontroller or equivalent processor or control circuitry of a conventional type for receiving the command FUEL and for generating timed injector commands PW to be issued to individual engine fuel injectors prior to the intake event for the corresponding engine cylinder, as is generally known in the art.

Controller 38 also issues output command signal EGR to EGR valve 38 for providing a degree of restrictiveness of the EGR pipe 36 as a function of such parameters as MAP and TPS, to provide a desirable dilution of the engine intake air. Other engine control and diagnostic commands, such as ignition timing commands and signals indicating fault conditions in a plurality of engine systems, are issued by controller in any conventional manner.

The specific control operations providing for the volumetric efficiency correction in accord with this invention are illustrated in FIGS. 2–6. Such operations are to be executed periodically while the engine is operating. For example, the operations of FIGS. 2–6 may be stored in the form of a series of controller instructions in non-volatile memory, such as read only memory. The instructions are then executed in a step-by-step manner at a predetermined frequency, or upon occurrence of a periodic engine event, such as upon passage of each tooth or notch in crankshaft 30 past sensor 32 of FIG. 1.

To set up such controller operations, a start-up routine is stored in read only memory and is executed each time power is applied to turn on controller 38. The operations of such start-up routine are illustrated generally in FIG. 2. The routine of FIG. 2 starts at a step 100 upon application of power to start the controller 38, and proceeds to a next step 102 to carry out conventionally known controller initialization operations, such as including setting up pointers, counters, and flags to pre-established initial values, and clearing volatile memory devices, such as random access memory devices.

The routine next moves to a step 104 to enable interrupts used to trigger execution of time-based and event-based operations. The interrupts are used to temporarily suspend current controller operations and to redirect controller activity to interrupt service routines which include operations that are to take place following some passage of time or following some event. Several time-based interrupts are enabled at the step 104 to occur following corresponding predetermined time periods. Several event-based interrupts are also enabled to occur following events, including crankshaft events which correspond to a passage of a crankshaft tooth or notch past sensor 32 of FIG. 1.

Figure 2:
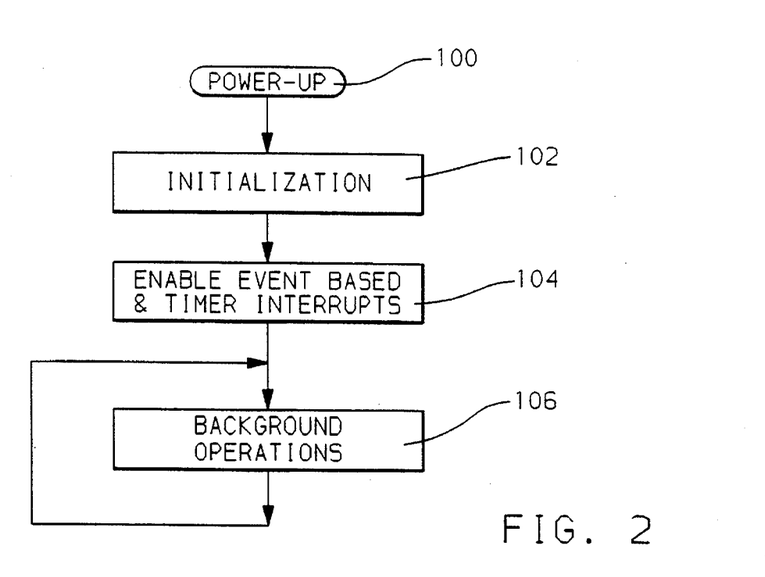
FIGS. 2–6 are computer flow diagrams illustrating a flow of controller operations for providing engine control operations of the preferred embodiment.
Figure 3:
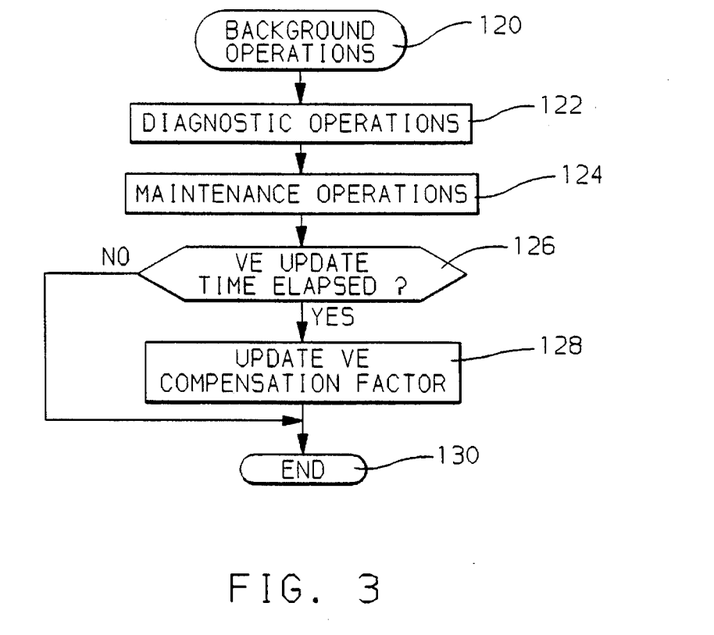

After enabling interrupts at the step 104, the routine of FIG. 2 continuously executes background operations, which may generally be described as relatively low priority operations including certain maintenance and diagnostic operations. FIG. 3 illustrates such operations in general form, is initiated at the step 106 of the routine of FIG. 2, and begins at a step 120. The background operations proceed to a next step 122 to carry out conventional controller or system diagnostics operations, and then to a step 124 to carry out conventional controller and system maintenance operations, such as are generally known in the digital control art.

The routine next determines whether a volumetric efficiency VE update time has elapsed since either the controller was powered-up or since the last time VE update operations were carried out. Generally, the VE value used in the generation of cylinder inlet air mass under at least transient operating conditions is corrected in accord with a compensation factor periodically generated while the controller is operating. The correction factor accounts for temperature of the intake air mass and the deviation in such temperature away from calibration temperature, and accounts for heating of the intake air mass as it passes through to the engine cylinders. Further, the compensation factor of the present embodiment accounts for combustion chamber temperature and the degree of deviation of the combustion chamber temperature away from calibration temperature through a modelling of the combustion chamber temperature and a modelling of the heat transfer between the combustion chamber s of the engine and the intake air and fuel charge received therein.

In this embodiment, the compensation factor changes with engine conditions and parameters, requiring that the compensation factor be periodically updated, such as following the update time described at the step 126, which may be about 100 milliseconds in this embodiment. Accordingly, at the step 126, if such update time has elapsed since the last update of the compensation factor, a step 128 is executed to carry out update operations illustrated by the routine of FIG. 4. Following such operations, or if the update time has not elapsed at the step 126, the background operations of this embodiment are completed, and the routine of FIG. 3 proceeds to a step 130 to return to FIG. 2, at which time the background operations will be restarted for continuous execution thereof, as described.

Figure 4:
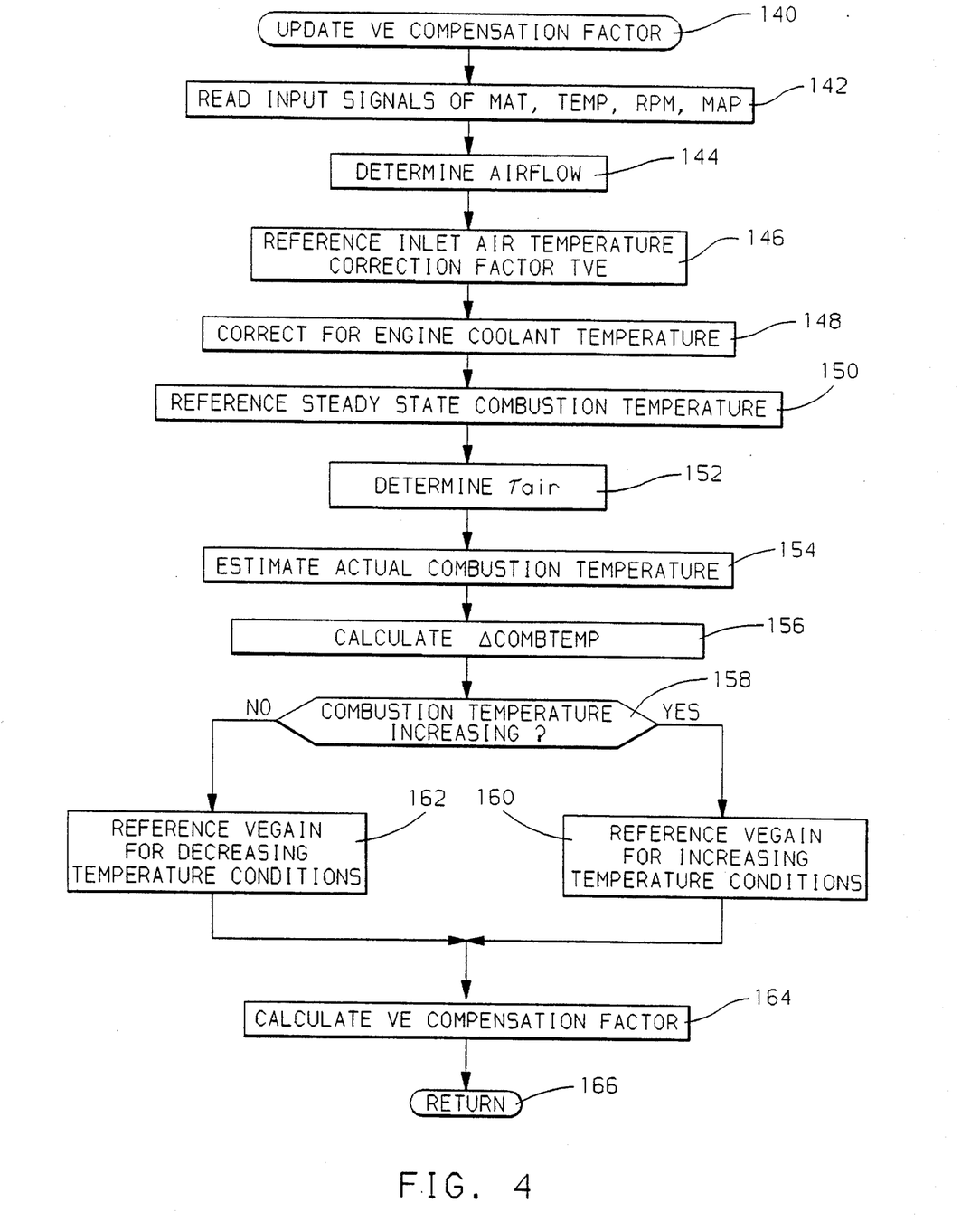

Referring to FIG. 4, a series of operations for updating a volumetric efficiency compensation factor are illustrated, beginning, when called at the described step 128 of FIG. 3, at a step 140 and proceeding to a step 142 to read input signals, such as the described signals MAT, TEMP, RPM, and MAP. The sensed values are used to indicate the current engine operating conditions under which the VE compensation factor is updated. Next, airflow into the engine is determined at a step 144 as follows:

$$AIRFLOW = MAP * RPM * K$$

in which K is a constant that may be determined through a conventional calibration process for the specific engine 10.

Figure 7:
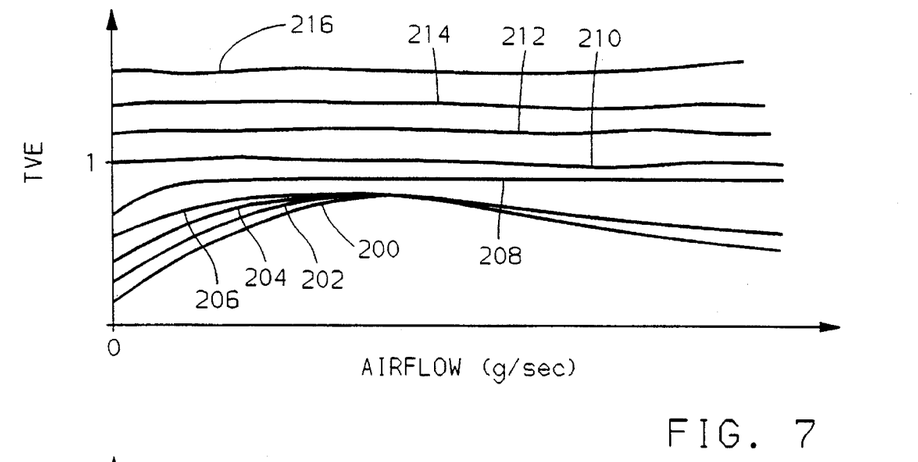
FIGS. 7–9 are graphical illustrations of representative parameter relationships for the carrying out of the operations of FIGS. 2–6.

After determining airflow, an inlet air temperature correction factor is referenced at a next step 146 as a function of the determined airflow and of MAT to account for deviation in temperature away from a calibration temperature and to account for the effect of heat transfer between the engine and the intake air mass on volumetric efficiency, such as due to any reduction in intake air density due to heating up of the intake air mass and to the intake air turbulence caused by such heating and the consequent disruption on airflow into engine cylinders. The parameter MAT provides a measure of the intake air temperature in the intake manifold 18 of FIG. 1, and airflow indicates the rate at which air is available in engine intake air passages for heat transfer from the engine to the intake air. Low airflow corresponds to a greater intake air mass residence time, increasing any heat transfer to the intake air mass, generally reducing volumetric efficiency. As the temperature difference between the intake air (MAT) and the engine increases, the heat transfer will increase for a given airflow, reducing the volumetric efficiency. The relationship between the correction factor TVE and the parameters of MAT and airflow must be calibrated through a conventional calibration process by measuring or estimating such relationship. The family of curves 200–216 of FIG. 7 illustrates a typical calibrated relationship between MAT, airflow and TVE. Each curve corresponds to a calibration between airflow and TVE for a different static MAT value. For example, curve 200 corresponds to a MAT of about −28 degrees Celsius, curve 202 to a MAT of about −16 degrees Celsius, curve 204 to a MAT of about −4 degrees Celsius, curve 206 to a MAT of about 8 degrees Celsius, curve 208 to a MAT of about 20 degrees Celsius, curve 210 to a MAT of about 32 degrees Celsius, curve 212 to a MAT of about 44 degrees Celsius, curve 214 to a MAT of about 56 degrees Celsius, and curve 216 to a MAT of about 68 degrees Celsius. The correction factor TVE is applied as a multiplicitive factor to a volumetric efficiency value. The unity correction factor corresponding to curve 210 illustrates that the volumetric efficiency calibration of this embodiment was carried out at a MAT of about 32 degrees Celsius. For MAT above the calibration temperature, TVE increases above unity to correct for a low VE calibration under calibration conditions. For MAT below the calibration temperature, TVE decreases below unity to correct for a greater amount of intake air heating than was accounted for in the VE calibration, due to the increase in temperature difference between the intake air and the engine. The result is a VE correction factor that accounts for significant variation in intake air temperature MAT and wide airflow variation and the impact on heat transfer between the engine and the intake air caused thereby in the VE determination.

The relationships of FIG. 7 may be stored in controller read only memory or other non-volatile memory device in the form of a conventional lookup table, having lookup parameters of MAT and airflow and having an output value of TVE, reflecting the calibrated relationships therebetween, as is generally understood in the art. After referencing TVE at the step 146, an engine actual temperature correction is applied to TVE at a next step 148, for example by referencing a correction factor from a conventional lookup table stored in controller read only memory as a predetermined function of engine temperature as indicated by engine coolant temperature TEMP. The considerations of heat transfer provided for in the TVE value referenced at the described step 146 do not significantly affect VE at low engine temperatures, such as following an engine coldstart when the engine and the intake air are substantially the same temperature and thus there is no substantial heat transfer to or from the intake air during passage to the engine cylinders. As such, for low TEMP values, the TVE value determined at the step 146 will be reduced toward unity at the step 148. Furthermore, at extremely high engine temperature, indicated by extremely high TEMP values, additional heat transfer will occur as the intake air passes cylinder intake valves, increasing the VE in a manner not modelled through the compensation provided at the described step 146. Accordingly, for extremely high coolant temperature, TVE will be slightly increased through compensation provided at the step 148, to properly model such heating effects.

The TVE correction provided at the step 148 may be generated during a calibration process in which the impact of TEMP extremes may be measured and values stored in controller read only memory to account for such measured impact. For example, in this embodiment, the TVE correction may be a TVE gain that is slightly greater than unity gain for coolant temperature at or above 80 degrees Celsius, and may decrease to drive TVE toward a unity gain for low engine TEMP values corresponding to conditions at which there is a small difference between intake air temperature and engine temperature, such as values less than or equal to about 8 degrees Celsius in this embodiment.

After correcting TVE for engine temperature, the routine of FIG. 4 proceeds to a next step 150, to reference a steady state combustion temperature value SSCT, such as by applying engine parameters of MAP and RPM to a calibrated model of combustion temperature stored in the form of a conventional lookup table as a function of MAP and RPM. Such table may be generated in a conventional calibration process by directly measuring or estimating, or by modelling combustion temperature at various steady state engine operating conditions, such as conditions indicated by various stable values of RPM and MAP.

After referencing SSCT, a time constant $\tau air$ used as a filter coefficient in this embodiment is referenced at a next step 152 as a function of airflow, such as the airflow determined at the described step 144. Under transient conditions, for example in which engine parameters of MAP or RPM may be changing rapidly, the actual combustion temperature will lag behind the steady state combustion temperature for the current MAP and RPM value by a lag amount that may be accurately characterized by a conventional lag filter equation having a time constant $\tau air$ determined as a function of airflow. For greater airflow, the combustion temperature will be driven more rapidly by the heat transfer properties of the volume of air passing through the combustion chamber toward its steady state value than for low airflow values. Generally in this embodiment, the value of $\tau air$ ranges from about 0.055 for low airflow values of just a few grams per second to a value of about 0.14 for high airflow values of about eighty grams per second. Such values should be determined through calibration of the time rate of change of combustion temperature away from a steady state value determined as a function of engine parameters, all as a function of airflow.

After referencing τair as a function of airflow at the step 152, a next step 154 is executed to estimate actual combustion temperature ACT using the steady state combustion temperature value SSCT and the time constant τair as follows $$ACT = \tau air * SSCT + (1-\tau air) * ACT$$

in accord with a conventional lag filter process with a dynamic filter coefficient or time constant τair.

A combustion temperature difference term ΔCOMBTEMP is next generated at a step 156 as the difference between SSCT and ACT. Such difference is used to compensate the degree of deviation in combustion temperature away from the temperature at which steady state VE values are calibrated, as will be further detailed. After determining the temperature difference, a gain factor is referenced at the next steps 158–162 as a function of airflow. Generally, the temperature lag between steady state and current combustion temperature values perturbs VE less under high airflow conditions characterized by a greater amount of air exposed to the heat of the combustion chamber temperature for less time. When airflow decreases, the temperature difference between intake air and the combustion chamber has a greater impact on VE, due to a greater heat transfer from the combustion chamber to the air present therein, due to the smaller air mass in the chamber and the increased residence time of such air mass in the chamber.

Figure 8:
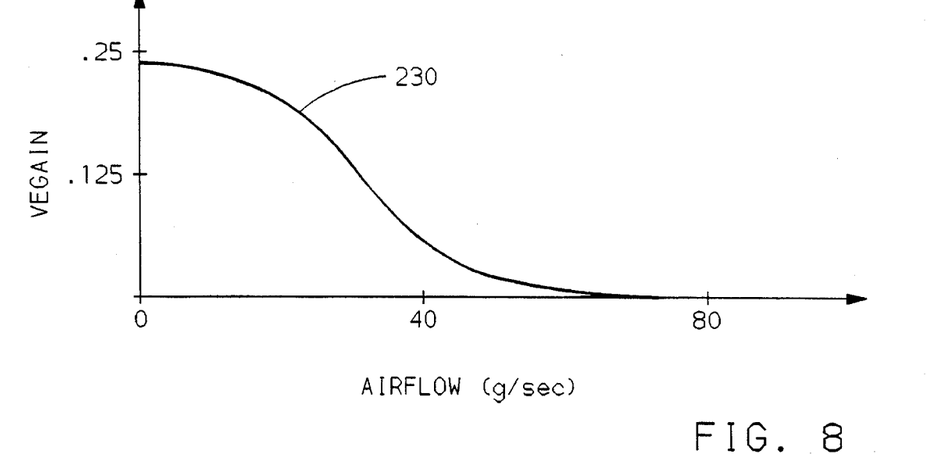
Figure 9:
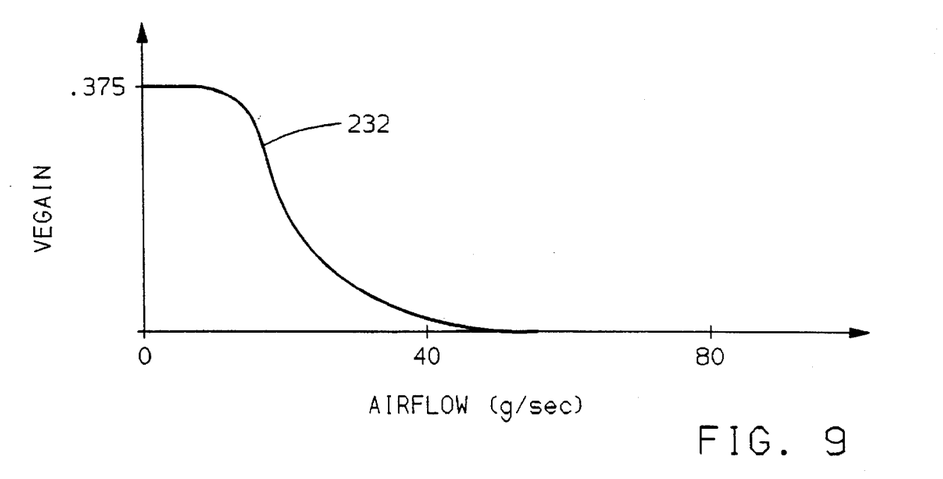

A gain factor VEGAIN is provided in this embodiment to account for such varying impact of the temperature difference on VE. VEGAIN has been characterized, through experimental observation, to vary as a function of airflow and as a function of whether the combustion chamber is increasing or decreasing in temperature. Accordingly, VEGAIN has been calibrated and stored in two calibration relationships in this embodiment, one for increasing and one for decreasing combustion chamber temperature. The relationships may be stored in the form of conventional lookup tables in controller read only memory, or in the form of functions of airflow and direction of change in combustion temperature. The first relationship illustrated by curve 230 of FIG. 8 provides a volumetric efficiency gain VEGAIN as a function of airflow for decreasing combustion temperature. Curve 232 of FIG. 9 illustrates the relationship for increasing combustion temperature. Such relationships generally illustrate that the temperature difference will have a greater impact on change in VE for lower airflow, when the combustion chamber temperature has a greater effect on intake airflow temperature, due to a smaller mass of intake air being resident in the combustion chamber for a longer period of time. The specific relationships of FIGS. 8 and 9 are calibrated in a conventional calibration process and stored in the form of standard lookup tables in read only memory.

Returning to FIG. 4, values are referenced from the table in which the relationships of FIGS. 8 and 9 are stored following the described step 156, by proceeding to a next step 158, at which step it is determined whether combustion temperature is increasing. If the temperature is increasing over the combustion temperature read for a prior iteration of the routine of FIG. 4, indicating that the combustion chamber is heating up, a next step 160 is executed at which VEGAIN is referenced from the lookup table corresponding to the curve 232 of FIG. 9 as a function of the current airflow. Alternatively, if the combustion chamber temperature is not increasing, VEGAIN is referenced at a next step 162 from a lookup table in which the relationship illustrated by curve 230 of FIG. 8 is stored as a function of airflow. The VEGAIN value, whether referenced at the step 160 for increasing combustion chamber temperature or at the step 162 for decreasing combustion chamber temperature, is next applied in the calculation of the VE compensation factor VEMOD at a next step 164. The VE compensation factor VEMOD is calculated in this embodiment as follows:

$$VEMOD = TVE + (\Delta COMBTEMP * VEGAIN)$$

to incorporate the intake air temperature compensation corrected with the engine temperature model information with the combustion chamber temperature compensation, in accord with this embodiment. After generating the VE compensation factor VEMOD, a next step 166 returns controller operations to the step 128 of FIG. 3, for continued execution of the standard background operations of this embodiment, as described.

Figure 5:
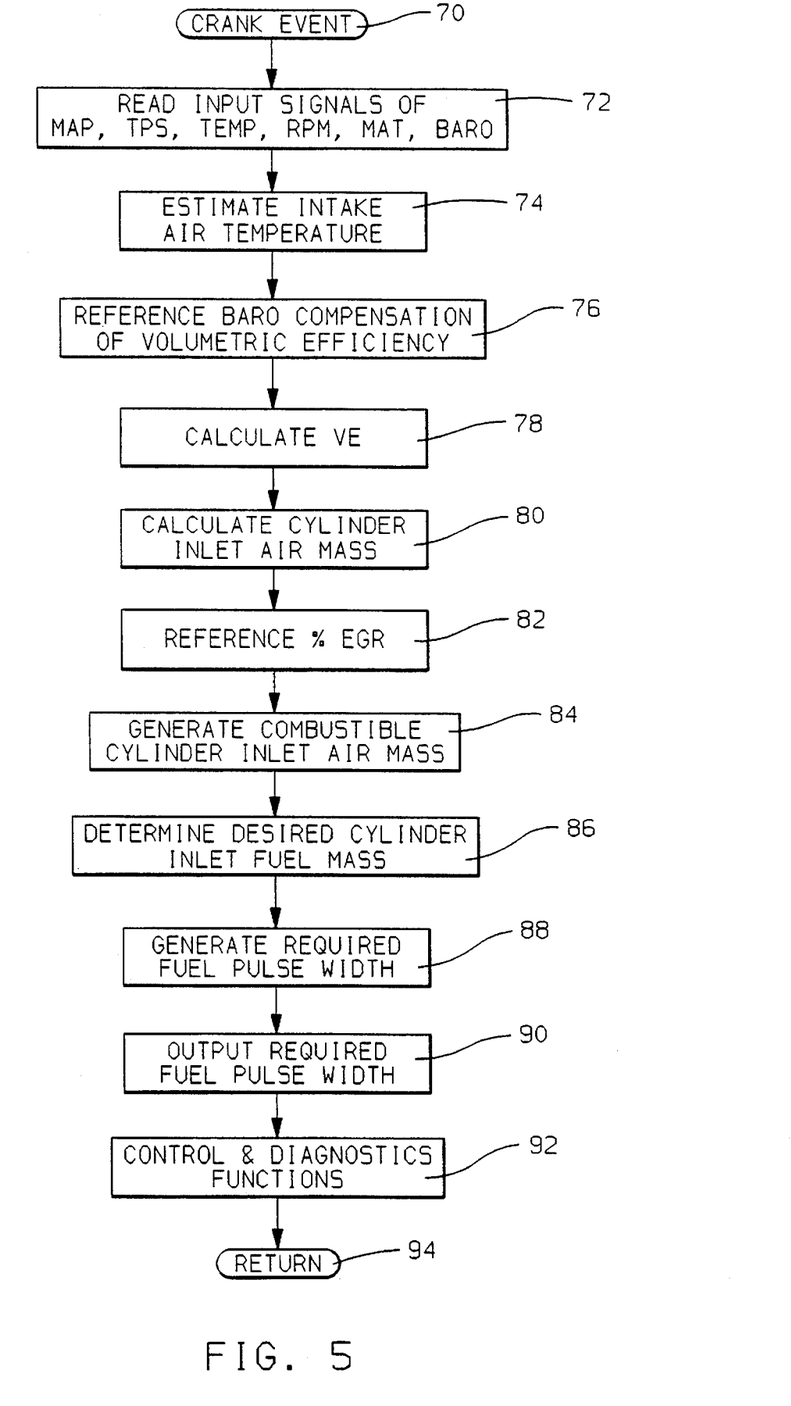

Referring to FIG. 5, a flow of operations of a crank event interrupt service routine is illustrated. Such operations are to be carried out to service a crank event interrupt, such as an interrupt initiated for each engine cylinder fueling event, as may be conventionally sensed by a tooth or notch passage or a predetermined plurality of tooth or notch passages by the crankshaft position sensor 32 of FIG. 1, as is generally known in the art. It is further generally understood in the art that service operations of such an interrupt include engine control operations. Additionally in this embodiment, such interrupt is serviced by incorporating the volumetric efficiency compensation information in a determination of a cylinder inlet air mass term, so that a desirable engine fueling command may be issued in accord with a preferred engine air/fuel ratio, such as the stoichiometric ratio.

Specifically, upon occurrence of the interrupt, the service routine of FIG. 5 is executed, starting at a first step 70 and proceeding to next step 72 at which samples are taken of present values of input signals including signals MAP, TPS, TEMP, RPM, MAT, and BARO of FIG. 1. Intake air temperature is next estimated at a step 74 as follows:

$$AIRTEMP = K * MAT + (1-K) * TEMP$$

in which K is a calibration constant accounting for the heating effect of the engine on intake air passing to the intake manifold, as may be determined through analysis of intake air temperature change as the air passes into the intake manifold over a range of engine coolant temperature values. Alternatively, intake air may be measured directly through a commercially available temperature sensor exposed to the intake air.

After estimating or measuring intake air temperature, a barometric pressure compensation factor BAROVE is referenced at a next step 76 as a volumetric efficiency compensation value by applying the signal BARO to a predetermined function or to a stored lookup table, yielding a compensation value to account for a known relationship between barometric pressure and volumetric efficiency in accord with the Ideal Gas Law. A volumetric efficiency VE calculation routine is next carried out at a step 78 by initiating and executing the sequence of operations of FIG. 6, to be described. After calculating VE through the operations of the routine of FIG. 6, the operations of the routine of FIG. 5 are continued at a next step 80 at which cylinder inlet air mass Mair is calculated as follows:

$$Mair = (MAP * (K1/TEMP) * VE * CYLVOL * BAROVE)/K2$$

in which K1 and K2 are scaling constants, and CYLVOL is measured cylinder volume for the engine 10 of this embodiment.

The amount of recirculated engine exhaust gas EGR expressed as a percentage of total engine cylinder intake air volume %EGR is next generated at a step 82, for example as a calibrated function of the intake manifold pressure MAP, engine speed or load, and EGR valve position, as is generally known in the art. The value %EGR indicates the amount of intake air displaced by engine exhaust gas not contributing substantially to combustible engine air/fuel mixture, and must be accounted for in a determination of the desired fueling for achieving the desired engine air/fuel ratio. More specifically, a next step 84 is executed to generate the combustible cylinder inlet air mass MCair as follows:

$$MCair = (1 - \%EGR) * Mair$$

to correct Mair for the amount of air volume in the cylinder displaced by recirculated engine exhaust gas in the cylinder. To provide for the desired engine air/fuel ratio, such as the stoichiometric ratio, a next step 86 determines the desired fuel mass Mfuel to be combined with the combustible air mass MCair and admitted to the engine cylinders for combustion, as follows $$Mfuel = MCair/(A/F)$$

in which A/F is the desired air/fuel ratio, such as about 14.6 in this embodiment. A fuel injector opening command pulse command FUEL is next generated to provide such a desired fuel mass at a step 88 as follows $$FUEL = Mfuel/FR$$

in which FR is the calibrated fuel injector flow rate determined from such parameters as fuel injector orifice geometry and fuel pressure, as is generally understood in the art. The command FUEL corresponds to the time the injector is to be opened to allow pressurized fuel to pass therethrough into an engine intake air passage upstream of the intake valve of the cylinder to be fueled, as is generally practiced in the art. The command FUEL is next output to the fuel controller 40 of FIG. 1 at a step 90. The fuel controller 40 then may convert FUEL into an injector drive voltage pulse PW of duration (pulsewidth) corresponding to the time the injector should be opened to meter the fuel pulse, and should time application of the pulse PW to the appropriate fuel injector corresponding to the engine cylinder about to undergo an intake valve opening event. The timing of application of the pulses to the various fuel injectors in accord with this embodiment may be determined and carried out in the manner described in the detailed description of copending U.S. patent application Ser. No. 211,334, filed 13 Apr., 1995, assigned to the assignee of this application, and incorporated herein by reference.

Returning to FIG. 5, after outputting the required pulse width in the form of command FUEL, a next step 92 is executed to carry out any conventional control or diagnostic functions required to provide for conventional automotive control, such as engine ignition or inlet air control, or engine sensor, actuator or system diagnostics, or controller diagnostics that may be required for each engine crank event. Following execution of such control and diagnostics operations, the routine moves to a next step 94 to return from the servicing of the interrupt to resume execution of any operations that were ongoing and were temporarily suspended at the time of the interrupt, such as the background operations of FIG. 3.

Figure 6:
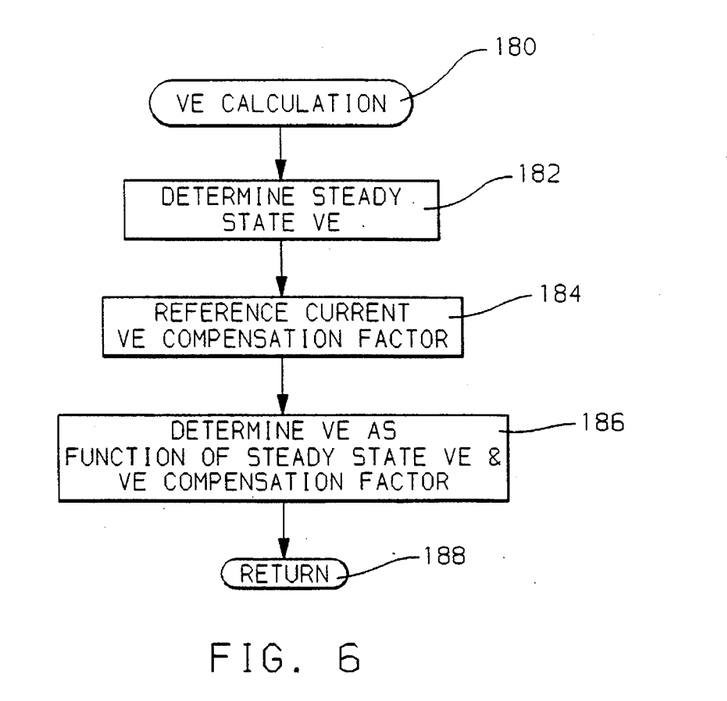

Referring to FIG. 6, a series of controller operations for calculating a volumetric efficiency value are provided. Such operations begin at a step 180 when initiated at the described step 78 of FIG. 5. The routine proceeds to a next step 182 to determine a steady state volumetric efficiency value SSVE as a predetermined, calibrated function of such engine parameters as engine speed RPM and engine intake manifold absolute pressure MAP. For a given engine application, SSVE may be determined experimentally through a conventional calibration process at steady state engine operating conditions and with a substantially constant intake air temperature. Any conventional manner of measuring or estimating volumetric efficiency may be used to determine SSVE over the operating ranges of RPM and MAP. The SSVE values may be stored in the form of a conventional lookup table as a function of the engine speed and MAP at which the SSVE value was calibrated. At the step 182, the SSVE value corresponding to the present RPM and MAP is referenced.

Next, the current VE compensation factor is referenced at a step 184. The referenced value should be the most recently updated VE compensation factor, as determined through the operations of the most recent iteration of the described routine of FIG. 4. Volumetric efficiency VE is next determined as a function of the SSVE value retrieved at the step 182 and the compensation factor referenced at the step 184, such as by multiplying SSVE by the compensation factor. After determining VE at the step 186, a step 188 is executed to return to the operations of FIG. 5, to continue the described engine control operations thereof.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. A method for controlling internal combustion engine air/fuel ratio, comprising the steps of:

estimating engine cylinder combustion temperature;

determining a steady state engine cylinder volumetric efficiency when the engine cylinder combustion temperature is substantially at a predetermined calibration combustion temperature;

determining the difference between the calibration combustion temperature and the estimated engine cylinder combustion temperature;

calculating a correction factor as a predetermined function of the determined difference;

determining engine cylinder intake air mass as a predetermined function of the steady state engine cylinder volumetric efficiency and of the correction factor;

referencing a desired engine air/fuel ratio;

calculating a cylinder fueling command as a predetermined function of the determined engine cylinder intake air mass and of the referenced desired engine air/fuel ratio; and admitting a fuel quantity to the engine in accord with the calculated cylinder fueling command.

2. The method of claim 1, wherein the step of estimating engine cylinder combustion temperature further comprises the step of filtering the steady state combustion temperature by passing the steady state combustion temperature through a predetermined filtering process, wherein the estimate of the engine cylinder combustion temperature is the filtered steady state combustion temperature.

3. The method of claim 2, further comprising the steps of:

sensing engine mass airflow;

determining a time constant as a predetermined function of the sensed engine mass airflow; and applying the determined time constant as the time constant of the predetermined filtering process.

4. The method of claim 1, further comprising the step of:

sensing engine mass airflow rate;

and wherein the step of calculating a correction factor calculates the correction factor as a predetermined function of the determined difference and of the sensed engine mass airflow rate.

* * * * *